United States Patent Office 3,523,070
Patented Aug. 4, 1970

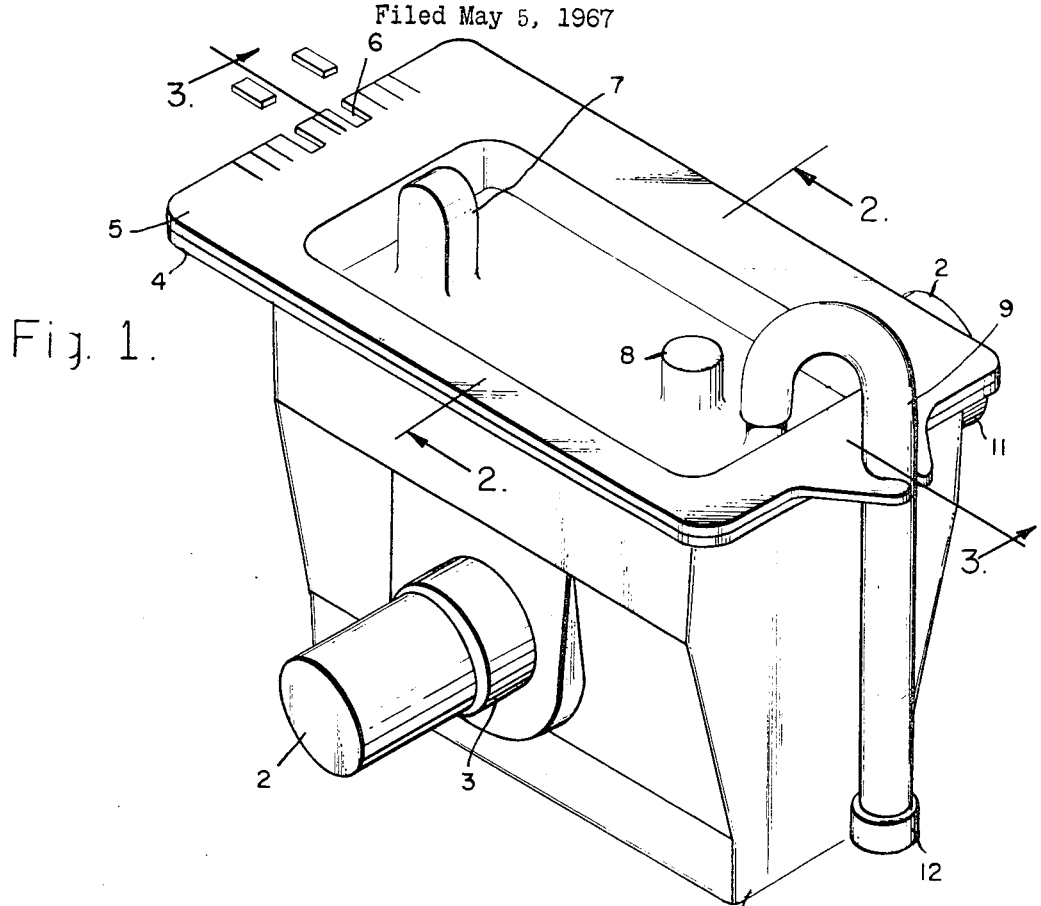
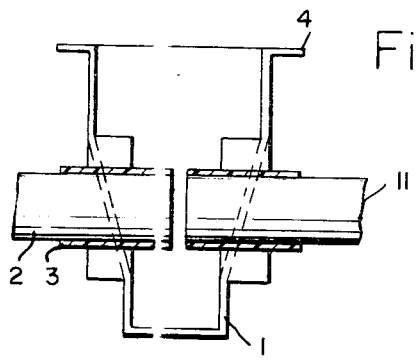
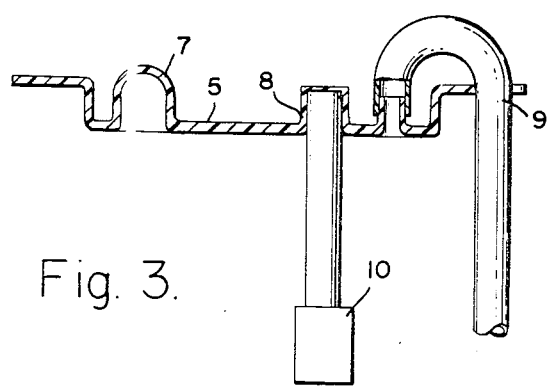
Herbert P. Silverman,
Harold A. Price,
INVENTORS.

3,523,070
DISPOSABLE TEST CELL
Herbert P. Silverman and Harold A. Price, Orange, Calif., assignors to TRW Inc., Redondo Beach, Calif., a corporation of Ohio
Filed May 5, 1967, Ser. No. 636,534
Int. Cl. G01n 27/00, 27/28
U.S. Cl. 204—195                                3 Claims

ABSTRACT OF THE DISCLOSURE

This invention relates to a disposable test cell including disposable electrodes for analyzing electrochemical reactions, for use in fully automated testing instruments. The test cell comprises two electrodes spaced apart so that the ends are separated by a thin film of the liquid to be analyzed. A comparison of the change of current or potential vs. time or after a fixed period of time across the thin film with a standard characterizes the rate of chemical reaction occurring in the cell.

---

Among the frequent problems occurring in the analysis of electroactive chemical materials such as numerous organic compounds, is the lack of reproducible results or the lack of sharply defined results. These poorly defined results may be attributed to poorly defined electrode surfaces or to complex reactions having complicated and varied stoichiometry, whose products are subject to diffusion into the surround electrolyte. To further complicate the determinations, contaminants from external sources may affect the desired reactions and give false readings or they may "poison" the electrode surface. These contaminants may result from dissolution of material in which the electrolyte comes in contact, from improper analytical procedures, or from previous determinations carried out in the cell.

To overcome these disadvantages, this invention teaches a test cell which has facially-exposed electrodes adjustable from positions of contact to several microns separation, thereby providing a thin film of liquid to be analyzed therebetween, and which may be discarded after each analytical determination. To prevent contamination from dissolution of the test cell container, materials of construction are selected which will be substantially inert with respect to the electrolyte and dissolved compounds. Moreover, when rapid determinations are desired, extensive cleaning procedures are not necessary to remove the residual materials from the previous analysis since a new test cell is used for each analysis.

A better understanding of the present invention may be obtained from the following detailed description of the cell which is to be read in connection with the accompanying drawing, wherein:

FIG. 1 is an overall prospective view of the test cell;

FIG. 2 is a cross-sectional view of the container generally shown in FIG. 1 taken along the line 2—2 of that figure; and FIG. 3 is a cross-sectional view of the top of the container of FIG. 1 taken along the line 3—3 of that figure.

FIG. 1 shows a general view of the overall test cell assembly in which electrode 2 coated with insulation 3 is protruding from one side of container 1. Electrode 11 (see FIG. 2) protrudes from the other side. The top or cap 5 may be heat sealed to flange 4 at the top of container 1. One end of the top may be codified by color or by notching 6 to indicate the type of reagent in protrusion 7. Access port 8 may be capped to seal the test cell prior to use. Overflow spout 9 may be closed by a blow-off cap 12 to provide a hermetically sealed cell. Overflow spout 9 permits the escape of container gas and assurance that the test cell is completely filled with liquid thereby assuring constant volume for each analysis.

The container of the test cell may be produced from a variety of materials depending upon the application for the test cell. The main criterion for selection of construction materials is their inertness with respect to the materials which will be used therein. The most suitable construction material for overall applications are plastics. This is not to be taken to mean that metals or glass would not be suitable for certain applications. However, certain modifications would be required when using metals, such as an inert coating on the internal surface of the cell, or when using glass, such as providing a leak proof seal around the movable electrodes.

Electrodes 2 and 11 shown in FIG. 2 may be constructed of any suitable electrode material and may be of any suitable cross-sectional configuration. The electrode material may be any conductive metal in which the face of the electrode has been plated with a noble metal. For most applications, brass, copper, aluminum, or iron which is coated with platinum, rhodium, iridium, palladium, gold is suitable. As an alternative, conductive carbon may be used for an electrode material. Regardless of the cross-sectional configuration of the electrode, circumferential insulation around the face of the electrode is necessary to prevent unwanted current paths from the sides of the electrodes.

FIG. 3 shows the cap assembly for the test cell in somewhat greater detail. The pellet housed in compartment 7 may be a rupturable capsule or crushable tablet of a reagent. Access port 8 permits the introduction of materials into the test cell which are discharged through filter 10. Filter 10 may be a porous plastic, cloth, metal, or paper filter depending upon the materials which are passed through it. The filter must be sufficiently strong and inert to withstand the material passing through it.

Operation of the test cell is well adapted for a large number of rapid determinations in an automated arrangement. When a particular electrochemical analysis is desired, a test cell containing the proper reagent is selected. Which cell is proper for the analysis is determined by the code 6 at the end of the test cell cap. This code corresponds with the reagent pellet in 7. In an alternative arrangement code 6 might identify a cell containing a specific liquid reagent. The electrodes of the selected cell are then attached to electrical terminals which may be accurately adjusted from a position of facial contact out to a position of several microns, generally 2 to 10 microns are preferred, and after the electrodes have been fastened to a power source and readout system, the fluid material to be tested is introduced through access port 8 until it flows through overflow tube 9. Some determinations may require agitation by gas sparge and/or movement of the electrodes. Moreover, the gas sparge may be used to regulate the temperature of the fluid in the cell, and this may be performed by introducing the gas through port 8 and filter 10. The electrodes are then moved to a selected position and a current-voltage reading is taken to determine the electrochemical properties of the mixture initially. After this reading has been determined, the reagent is introduced by crushing or breaking the pellet in 7 by pincers or a plunger so that the reagent falls into the liquid in the test cell. By subsequent readings, quantitative and qualitative determinations can be made by a comparison of the time-electrochemical properties of the material to be analyzed with the time-electrochemical properties of a known standard. When the analysis has been completed the test cell is simply disposed of and a new one selected for the next analysis.

The numerous advantages of this test cell will be obvious to those skilled in the art. This test cell permits the rapid analysis of several unrelated materials without the disadvantage of time consuming clean up of equipment. It is adaptable for use in fully automated test equipment. Additionally, accuracy is increased because more distinct time-potential or time-current readings may be obtained since the comparatively long diffusion spaces are eliminated by the use of the thin film layer between the electrode faces. Additionally the past history of the electrode surfaces will not influence the results.

We claim:

1. A disposable test cell comprising two facially-exposed circumferentially insulated conducting electrode rods sealed in an inert plastic container with their facial axes diametrically centered, wherein said electrodes are plated and adjustable from a position of contact to a position of several microns, and an inert plastic cap sealed onto said container and having means for holding a reagent pellet, an access port with connected filtering means for introducing test material into the cell, and an overflow means for removing gases and excess liquid.

2. A disposable test cell according to claim 1 wherein the electrode rods are a material selected from the group consisting of conductive carbon and conductive metal.

3. A disposable test cell according to claim 1 wherein the electrodes are plated with a metal selected from the group consisting of platinum, rhodium, iridium, palladium, gold, and silver.

References Cited

UNITED STATES PATENTS

| | | | |
|---|---|---|---|
| 1,995,492 | 3/1935 | Andrus et al. | 204—195 |
| 2,542,990 | 2/1951 | Carter et al. | 204—225 |
| 3,151,052 | 9/1964 | Arthur et al. | 204—195 |
| 3,421,989 | 1/1969 | Haagen-Smit | 204—195 |

TA-HSUNG TUNG, Primary Examiner

U.S. Cl. X.R.

204—225, 240, 276, 278